May 14, 1963 U. CARLEVARO ETAL 3,089,433
CABLE RAILWAY
Filed April 28, 1961 2 Sheets-Sheet 1
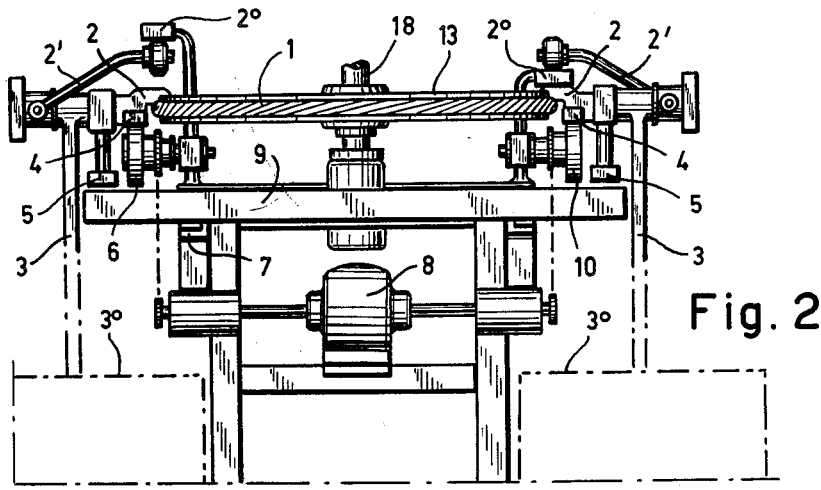
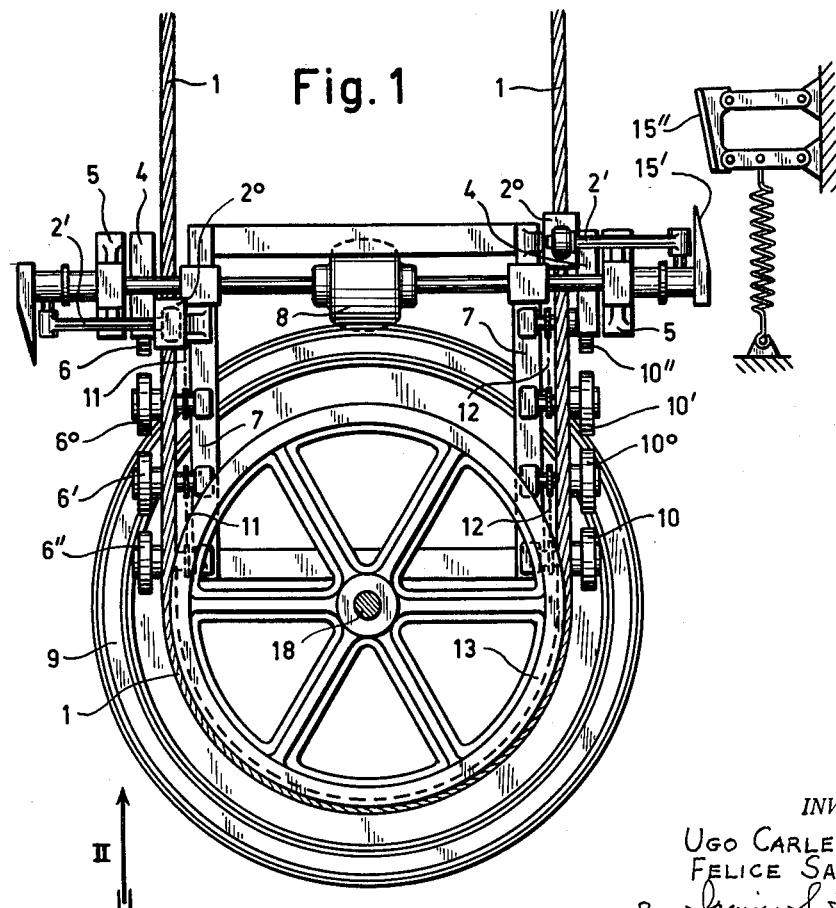
INVENTORS
UGO CARLEVARO AND
FELICE SAVIO
By Irvin S. Thompson
ATTORNEY

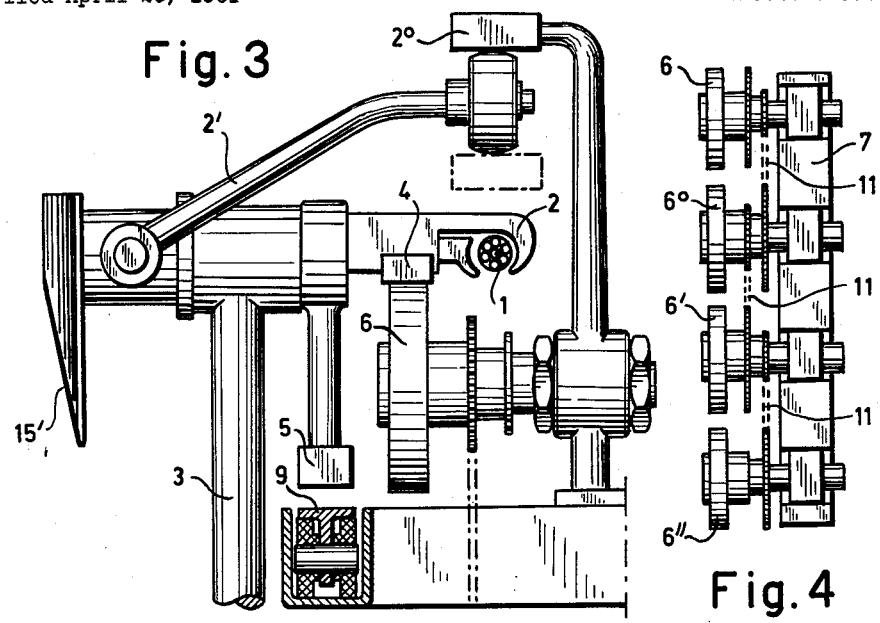
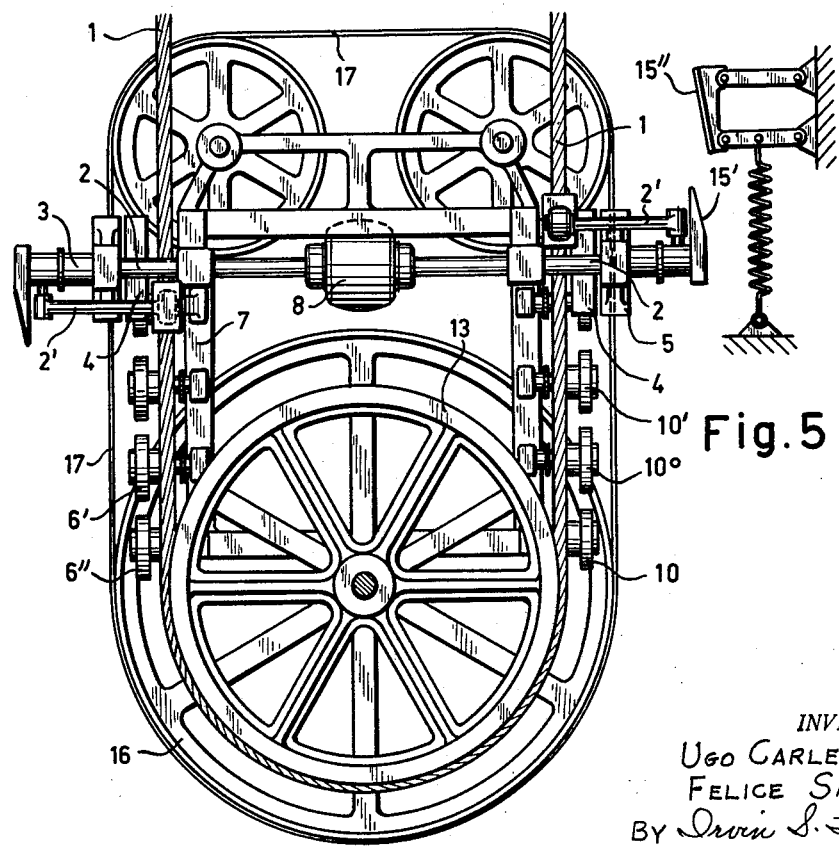

United States Patent Office 3,089,433
Patented May 14, 1963

3,089,433
CABLE RAILWAY
Ugo Carlevaro and Felice Savio, both of Via S.
Secondo 33, Turin, Italy
Filed Apr. 28, 1961, Ser. No. 106,249
Claims priority, application Italy May 5, 1960
5 Claims. (Cl. 104—134)

It is useful, in the operation of a single rope, quick travelling rope-railway, in which the rope is driven or advanced with a continuous and uniform movement, to provide means to obtain a speed slackening of a passenger cabin carried by the rope, upon its arrival at a station. This permits the cabin to be disengaged from the rope and compelled to run forward on a rail or similar supporting device, thereby allowing the passengers to land or to board, the cabin being thereafter accelerated until reaching the rope's speed and being then hooked again on said rope.

According to a known system, the cabin, provided with suspension rollers, is disengaged from the driving rope at its arrival at a station, thereafter being pushed manually on a circular guiding rail as soon as its kinetic force is exhausted, and urged forward to the restarting point, whereupon it is hooked again to the rope that will drag it in its return journey.

Several mechanical systems have been proposed in order to perform the above-mentioned speed slackening, as well as the manual leading and turning operation and said re-acceleration, but all of them have proved to be complicated and expensive.

According to the present invention, the gripping hooks that fasten the cabin to the rope (and consequently every cabin), instead of running on a rail by means of their own rollers, both while entering or leaving the station, are resting on series of rollers mounted on a fixed frame and are actuated at a desired speed in order to impress upon the cabin the necessary speed slackening and the following re-acceleration.

The accompanying drawings illustrate diagrammatically, as an example, two embodiments of the present invention.

FIG. 1 schematically illustrates a rope-railway station;

FIG. 2 is a lateral view in the direction of the arrow II in FIG. 1;

FIG. 3 is a detailed view on an enlarged scale of a portion of the invention;

FIG. 4 is a detailed view of the set of decelerating rollers of the invention, on an enlarged scale;

FIG. 5 is a modified form of the invention.

Reference number 1 indicates the bearing and driving rope passing along the rim of the fly-wheel ring 13 of the rope-railway plant, whereon the cabin suspension frame 3 is fixed by means of a gripping hook 2 of known type. The fly-wheel ring 13 is disposed with its shaft 18 on a vertical axis.

The frame 3 is also provided with suspension means 4 and 5 that are disposed parallel to the rope 1.

The support 4 having the feature of a slide shoe, is arranged to cooperate, as soon as the cabin is entering into the station, with a series of rollers 6–6°–6'–6" . . . mounted on a fixed member or frame 7 and driven through transmission means by a motor 8.

The ratios of said transmission means are such that the rollers 6 may have a peripheral velocity which is substantially equal to the linear velocity of the rope 1, whereas the following rollers 6°–6'–6" have gradually decreasing velocities until said velocity has reached the smallest value that may be considered suitable for the landing and the boarding of passengers into the cabin 3°.

The successive reduction of the peripheral velocity of the rollers may be obtained, for example, by transmitting the movement of every single roller to the following one by means of intermediate chain transmissions 11 from a higher to a lower speed.

The fastening hook 2 on the rope 1 opens itself when the cabin is entering into the station, through the cooperation of its driving arm 2' with a fixed catch 2° whereby the cabin, whose shoe 4 is resting on roller 6, will be engaged and driven by the latter, so that its shoe will be caused to engage with the following roller 6° and then rollers 6' and 6", at gradually decreasing speeds.

As soon as the cabin has reduced its velocity to the smallest suitable previously fixed extent, it will proceed at reduced speed for a short time in order to allow the interchange of passengers. The above is carried into effect as follows. When shoe 4 leaves rollers 6, the support 5 (that may be of the shoe or roller type) passes into engagement on a transporting device 9 which pulls support 5 and thus the cabin forward slowly (and if necessary even with a short intermediate resting pause) until the shoe 4 comes into engagement with the first of a series of accelerating rollers 10–10°–10'–10" . . . The transporting device 9 is in the form of a ring wheel surrounding the fly-wheel 13. The accelerating rollers are disposed symmetrically with respect to rollers 6 and by consequence are located at the beginning of the return route of rope 1. Said rollers 10 are driven in a similar manner as the rollers 6, through successional intermediate transmissions 12 whereby they have an increasing speed, from roller 10 to roller 10", the velocity of the latter being substantially equal to the linear velocity of rope 1.

The shoe 4 (and conjointly the cabin 3°) will accordingly be gradually accelerated on said rollers 10 until the rope velocity has been attained. At that very moment, the gripping hook 2 will be shut and the cabin will be firmly engaged anew with the rope 1.

When the cabin is just entering in the rope-way, i.e. as soon as the gripping hook 2 has been closed, it will meet with a braking element, for example with friction shoes 15'–15" which impose a predetermined resistance against its forward movement. In that way, if the fastening of the gripping hook 2 has not been performed perfectly, the cabin 3° will be kept back and an alarm signal, a plant stopping device or other security means may eventually be operated.

If on the contrary the fastening has been made in a perfect manner, the cabin will overcome this resistance and will initiate its return journey.

According to a variant, the conveyor 9 may be embodied by a ring ribbon or band 17 or alternately a chain driven at uniform speed, said speed being suggested to be of 0.30 meter (about 1 foot)/second; it may further be formed by a large wheel 16 rotating at above said peripheral velocity (or at other suitable velocity) round a vertical shaft 18' (on the same axis as was shaft 18) (like a "merry-go-round"), whose ring ribbon 17 is provided for receiving the support means 5, whereby the cabin is brought towards the first re-accelerating roller, with or without any intermediate rest pause.

In order to avoid the sliding of the shoe 4 with respect to the rollers during the passage from a roller to the following one, it is advisable to mount these rollers with a catch disengaging device (free wheel) on their own driving shafts.

We claim:

1. A cable railway comprising a supporting and driving rope, a plurality of cabins carried by said rope, means for gripping and ungripping said cabins on said rope, a plurality of arrival and departure stations along said rope, each of said stations having a rail disposed parallel to said rope for receiving said cabins, a first fixed member disposed at one extremity of said rail, said first fixed member being adapted to cooperate with said gripping means for releasing said cabins from said rope, a second fixed member disposed at the opposite extremity of said rail, said second fixed member being adapted to cooperate with said gripping means for gripping said cabins on said rope, means for decelerating said cabins, said decelerating means being disposed adjacent to said first fixed member for slackening the speed of said cabins after their release from said rope, and means for accelerating said cabins, said accelerating means being disposed adjacent to said second fixed member for accelerating said cabins before their gripping on said rope.

2. A cable railway comprising a supporting and driving rope, a plurality of cabins carried by said rope, means for gripping and ungripping said cabins on said rope, a plurality of arrival and departure stations along said rope, a rail disposed in each of said stations, said rails being positioned parallel to said rope for receiving said cabins, a first fixed member disposed at one extremity of said rail, said first fixed member being adapted to cooperate with said gripping means for releasing said cabins from said rope, a second fixed member disposed at the opposite extremity of said rail, said second fixed member being adapted to cooperate with said gripping means for gripping said cabins on said rope, means for decelerating said cabins, said decelerating means being disposed in correspondence to said first fixed member for slackening the speed of said cabins after their release from said rope, said decelerating means comprising a set of slackening rollers adapted to receive a cabin upon its arrival and means for imparting to each successive slackening roller a smaller speed than the preceding roller, the first slackening roller having a tangential speed substantially the same as the speed of said rope, and means for accelerating said cabins, said accelerating means being disposed in correspondence to said second fixed member for accelerating said cabins before their gripping on said rope and comprising a set of accelerating rollers adapted to receive a departing cabin and means for imparting to each successive accelerating roller a greater speed than the preceding roller, the last accelerating roller having a tangential speed substantially the same as the speed of said rope.

3. A cable railway comprising a supporting and driving rope, cabins carried by said rope, means for gripping and ungripping said cabins on said rope, arrival and departure stations along said rope, each of said stations having a supporting rail parallel to said rope for receiving said cabins, a first fixed member disposed at one extremity of said rail, said first fixed member being adapted to cooperate with said gripping means for releasing said cabins from said rope, a second fixed member disposed at the opposite extremity of said rail, said second fixed member being adapted to cooperate with said gripping means for gripping said cabins on said rope, means for decelerating said cabins, said decelerating means being disposed adjacent to said first fixed member for reducing the velocity of said cabins after their release from said rope, and means for accelerating said cabins, said accelerating means being disposed adjacent to said second fixed member for accelerating said cabins before their gripping on said rope, and in each station a fly-wheel having a vertical axis for sending back said cabins after their arrival, said rope passing around said fly-wheel, said supporting rail having the form of a ring wheel surrounding and disposed parallel to and concentric with said fly-wheel.

4. A cable railway comprising a supporting and driving rope, cabins carried by said rope, means for gripping and ungripping said cabins on said rope, arrival and departure stations along said rope, each of said stations having a supporting rail parallel to said rope for receiving said cabins, a first fixed member disposed at one extremity of said rail, said first fixed member being adapted to cooperate with said gripping means for releasing said cabins from said rope, a second fixed member disposed at the opposite extremity of said rail, said second fixed member being adapted to co-operate with said gripping means for gripping said cabins on said rope, means for decelerating said cabins, said decelerating means being disposed in correspondence to said first fixed member for slackening the speed of said cabins after their release from said rope, and means for accelerating said cabins, said accelerating means being disposed in correspondence to said second fixed member for accelerating said cabins before their gripping on said rope, said supporting rail comprising a ring ribbon and means for guiding said ribbon along a path whose active section is parallel to said rope.

5. A cable railway comprising a supporting and driving rope, cabins carried by said rope, means for gripping and ungripping said cabins on said rope, arrival and departure stations along said rope each of said stations containing a rail parallel to said rope for receiving said cabins, a first fixed member disposed at one extremity of said rail, said first fixed member being adapted to co-operate with said gripping means for releasing said cabins from said rope, a second fixed member disposed at the opposite extremity of said rail, said second fixed member being adapted to co-operate with said gripping means for gripping said cabins on said rope, means for decelerating said cabins, said decelerating means being disposed in correspondence to said first fixed member for reducing the velocity of said cabins after their release from said rope, means for accelerating said cabins, said accelerating means being disposed in correspondence to said second fixed member for accelerating said cabins before their gripping on said rope, and a stopping means disposed at the end of each station, said stopping means cooperating with said gripping devices for retaining a departing cabin when said cabin is insufficiently gripped on said rope.

References Cited in the file of this patent

UNITED STATES PATENTS

| | | |
|---|---|---|
| 898,008 | Sayer | Sept. 8, 1908 |
| 1,109,371 | Thrunhart | Sept. 1, 1914 |
| 1,656,589 | Kruckenberg et al. | Jan. 17, 1928 |
| 2,026,860 | Bender | Jan. 7, 1936 |
| 2,769,400 | Wallmannsberger | Nov. 6, 1956 |
| 2,955,544 | Goirand | Oct. 11, 1960 |

FOREIGN PATENTS

| | | |
|---|---|---|
| 518,644 | Germany | Feb. 20, 1931 |